(12) United States Patent
Doering et al.

(10) Patent No.: US 9,523,341 B2
(45) Date of Patent: Dec. 20, 2016

(54) METHODS AND SYSTEM FOR IMPROVING HYBRID TRANSMISSION GEAR SHIFTING

(71) Applicant: Ford Global Technologies, LLC, Dearborn, MI (US)

(72) Inventors: Jeffrey Allen Doering, Canton, MI (US); Michael Glenn Fodor, Dearborn, MI (US); Adam Nathan Banker, Canton, MI (US); Dennis Craig Reed, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 14/477,644

(22) Filed: Sep. 4, 2014

(65) Prior Publication Data

US 2016/0069318 A1    Mar. 10, 2016

(51) Int. Cl.
| | | |
|---|---|---|
| *F02D 37/02* | (2006.01) | |
| *F02P 5/15* | (2006.01) | |
| *B60W 10/06* | (2006.01) | |
| *B60W 10/11* | (2012.01) | |
| *B60W 30/19* | (2012.01) | |
| *F02D 41/00* | (2006.01) | |
| *F02D 41/02* | (2006.01) | |
| *F16H 61/04* | (2006.01) | |
| *F02N 11/04* | (2006.01) | |
| *F02N 15/02* | (2006.01) | |
| *F16H 63/50* | (2006.01) | |

(52) U.S. Cl.
CPC ............. *F02P 5/15* (2013.01); *B60W 10/06* (2013.01); *B60W 10/11* (2013.01); *B60W 30/19* (2013.01); *F02D 37/02* (2013.01); *F02D 41/0082* (2013.01); *F02D 41/023* (2013.01); *F02P 5/1504* (2013.01); *F16H 61/0437* (2013.01); *B60W 2510/10* (2013.01); *B60W 2710/06* (2013.01); *F02D 2250/21* (2013.01); *F02N 11/04* (2013.01); *F02N 15/022* (2013.01); *F16H 63/502* (2013.01)

(58) Field of Classification Search
None
See application file for complete search history.

(56) References Cited

U.S. PATENT DOCUMENTS

| | | | |
|---|---|---|---|
| 5,445,576 A | | 8/1995 | Motamedi et al. |
| 5,481,461 A | * | 1/1996 | Miyamoto ............. F01L 1/267 123/198 F |
| 5,562,567 A | | 10/1996 | Koenig et al. |
| 8,133,153 B2 | * | 3/2012 | Surnilla ............... B60W 10/06 477/107 |
| 9,222,427 B2 | * | 12/2015 | Matthews ........... F02D 41/0087 |
| 2010/0211297 A1 | * | 8/2010 | Doering ................. F02D 13/06 701/112 |

* cited by examiner

*Primary Examiner* — Justin Holmes
(74) *Attorney, Agent, or Firm* — David Kelley; Alleman Hall McCoy Russell & Tuttle LLP (57) ABSTRACT

Systems and methods for improving transmission gear shifting of a hybrid vehicle are presented. The systems and methods may allow transmission input shaft torque to be lowered to levels where driveline torque disturbances may be reduced even though the driveline has a larger inertia. In one example, driveline torque may be reduced via retarding spark timing.

19 Claims, 5 Drawing Sheets

METHODS AND SYSTEM FOR IMPROVING HYBRID TRANSMISSION GEAR SHIFTING

FIELD

The present description relates to methods and a system for shifting a multiple stepped gear ratio transmission of a hybrid vehicle. The methods may be particularly useful for hybrid vehicles that have relatively high inertia drivelines.

BACKGROUND AND SUMMARY

A hybrid vehicle may include an engine, driveline disconnect clutch, a dual mass flywheel, and a driveline integrated starter/generator (DISG) for propelling the hybrid vehicle and for selectively mechanically coupling the engine to the DISG and a transmission. The dual mass flywheel and disconnect clutch may significantly increase driveline inertia. The increased driveline inertia may lead to rougher transmission gear shifts because the inertia may affect transmission input shaft torque during gear shifts. If transmission input shaft torque is too high, a torque disturbance may occur in the driveline that is objectionable to a driver. Therefore, it may be desirable to provide a way of lowering transmission input shaft torque during transmission gear shifting so that a transmission may be smoothly shifted even though the driveline may have a higher inertia.

The inventors herein have recognized the above-mentioned disadvantages and have developed a method, comprising: operating a first group of engine cylinders at a first spark timing retarded from a minimum spark advance for best torque spark timing in response to a gear shift request; and operating a second group of engine cylinders at a second spark timing retarded from the minimum spark advance for best torque spark timing in response to the gear shift request, the second spark timing different from the first spark timing.

By operating two or more cylinder groups at different retarded spark timings, it may be possible to provide the technical result of reducing engine torque so that transmission gear shifting may be improved without operating the engine at conditions where engine torque production is inconsistent. For example, a first group of engine cylinders may be operated at a spark timing retarded from minimum spark timing for best torque (MBT), and a second group of engine cylinders may be operated at a different spark timing retarded from MBT to provide low engine torque with little torque variation. Spark timings where torque variation is increased may be avoided while low torque levels are provided.

The present description may provide several advantages. In particular, the approach may reduce the possibility of driveline degradation by reducing engine torque variation. Further, the approach may improve transmission shift feel. Additionally, the approach may be provided without additional driveline components.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
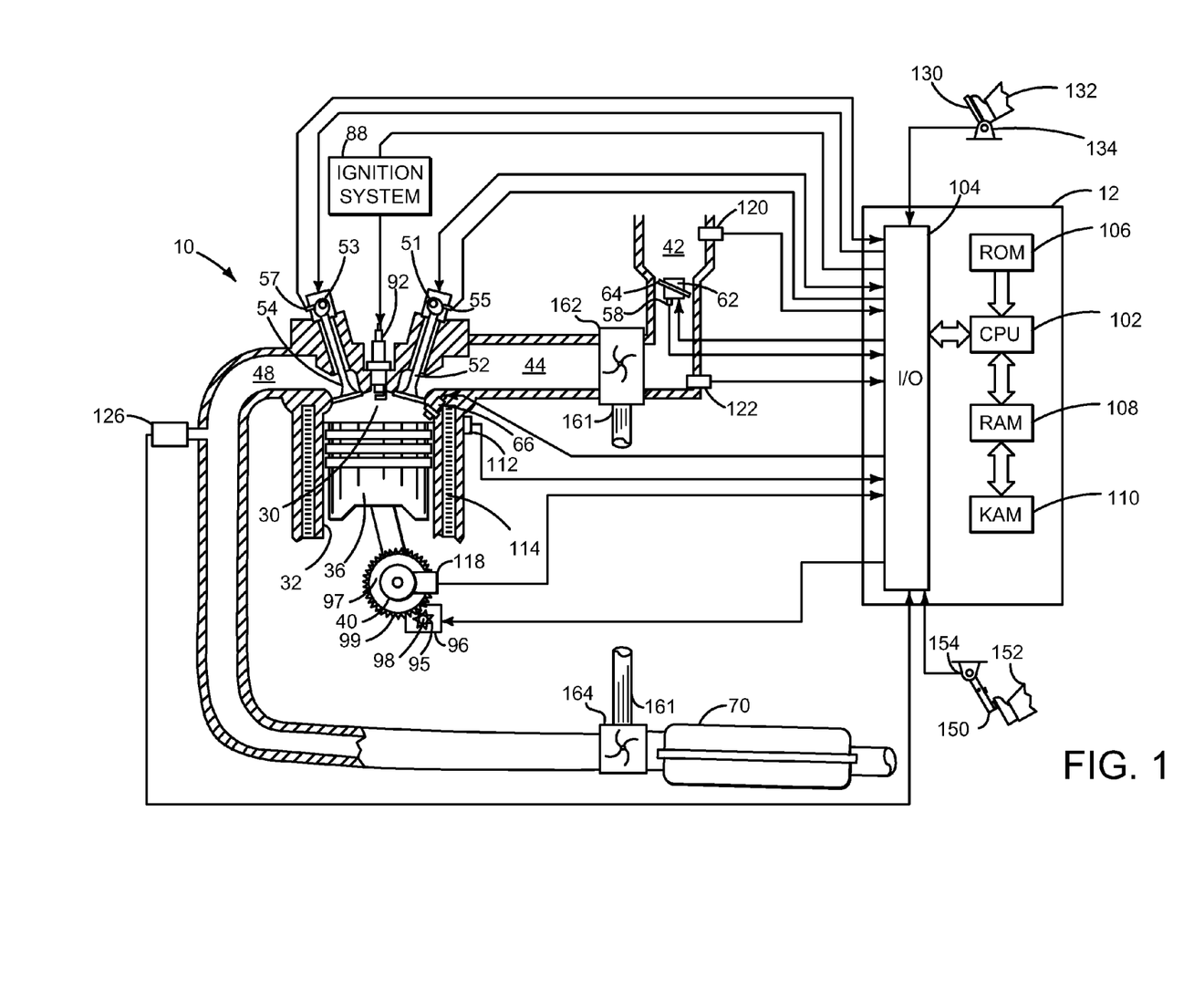
FIG. 1 is a schematic diagram of an engine.
Figure 2:
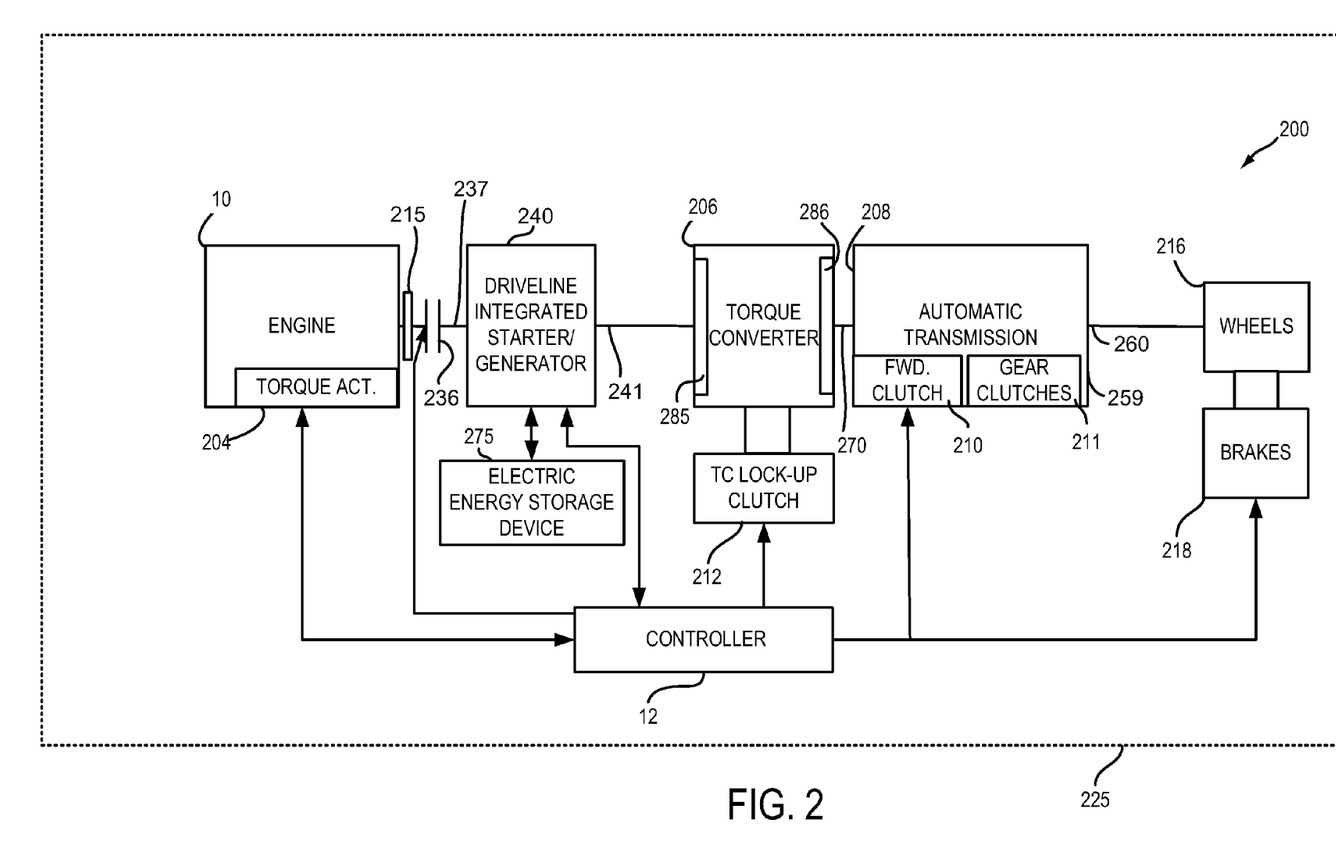
FIG. 2 shows an example vehicle driveline configuration.
Figure 3:
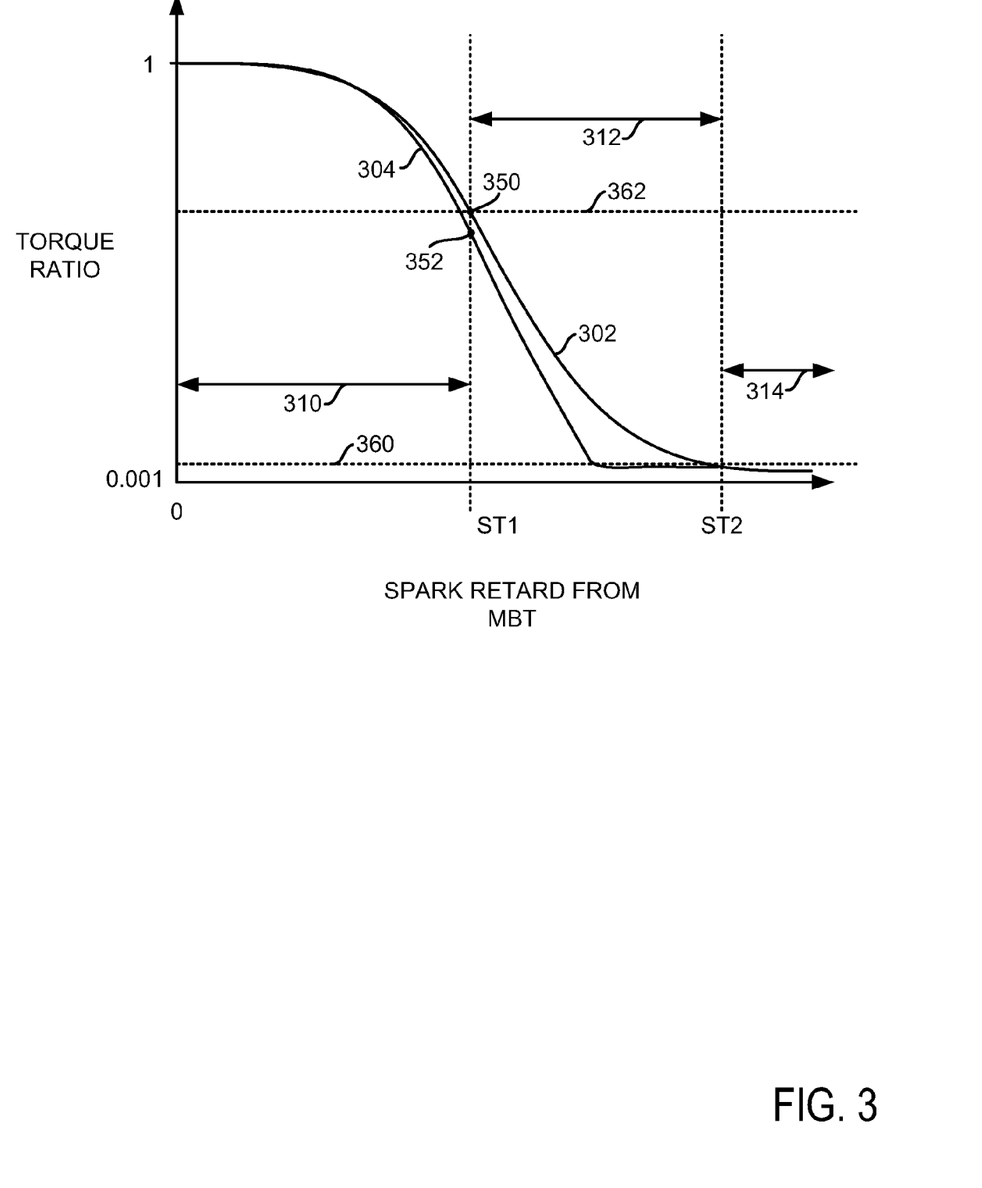
FIG. 3 shows a plot illustrating how cylinder torque ratio may vary with spark retard from MBT spark timing.

The present description is related to improving hybrid vehicle transmission gear shifting. A hybrid vehicle may include an engine as is shown in FIG. 1. Additionally, the engine may be included in a driveline of the hybrid vehicle as is shown in FIG. 2. Engine torque may be reduced during transmission gear shifting via retarding spark according to a torque ratio as is shown in FIG. 3. Engine spark timing may be controlled such that selected engine cylinders operate with a maximum spark retard while other engine cylinders operate at a torque stability limited spark according to the method of FIG. 4. Finally, FIG. 5 shows a sequence where spark timing is adjusted according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Referring now to FIG. 3, an example plot illustrating how cylinder torque ratio may vary with spark retard from minimum spark advance timing for best torque (MBT). A torque ratio may be expressed by the following equation:

$$SPARKTR = \frac{\Gamma_{\Delta SPK}}{\Gamma_{MBT}}$$

where SPARKTR is engine spark torque ratio, $\Gamma_{\Delta SPK}$ is engine torque at a spark timing retarded from MBT spark timing at present engine speed and load, and $\Gamma_{MBT}$ is engine torque at MBT spark timing at present engine speed and load.

The plot's Y axis represents cylinder torque ratio and the X axis represents spark retard from MBT spark timing. The vertical lines ST1 represents a first retarded spark timing and the vertical line at ST2 represents a second spark timing, ST2 is a more retarded spark timing than ST1. Horizontal line 362 represents a torque ratio above which engine torque production is consistent. Horizontal line 360 represents a torque ratio below which engine torque production is consistent, and it may be referred to as the torque ratio maximum spark retard. Engine torque production is inconsistent in the cylinder torque ratio range between horizontal line 362 and horizontal line 360.

Curve 302 represents an upper cylinder torque ratio limit versus spark retard from MBT, and curve 304 represents a lower cylinder torque ratio limit versus spark retard from MBT. If spark timing is retarded to ST1, the cylinder torque ratio may be between the values at 352 and 350. Thus, the cylinder torque ratio may vary even when spark is retarded to a same value.

Spark timings between MBT (e.g. at 0) and ST1 shown in the range described by leader 210 represent spark retard values where cylinder torque ratio provides a consistent engine torque. Spark timings between ST1 and ST2 in the range described by leader 312 represent spark retard values where cylinder torque ratio provides less consistent engine torque. Spark timings to the right of ST2 represent spark timings of consistent low engine torque.

The ranges for consistent and inconsistent engine torque may also be described based on torque ratio. In this example, as previously mentioned, horizontal line 362 represents a torque ratio above which engine torque production is consistent. Horizontal line 360 represents a torque ratio below which engine torque production is consistent (e.g., a desired cylinder torque varies by less than three standard deviations). Horizontal line 362 may be described as an cylinder torque ratio upper uniform spark limit. Spark more retarded than horizontal line 360 may be described as an cylinder torque ratio lower uniform spark limit or a torque ratio maximum spark retard. Cylinder torque varies by less than three standard deviations for torque ratios greater than that of horizontal line 360. Cylinder torque ratios between horizontal line 362 and 360 may provide inconsistent engine torque (e.g., cylinder torque that varies by more than three standard deviations from a desired cylinder torque). In other words, engine torque variation may be greater than a predetermined number of standard deviations (e.g., three standard deviations). Cylinder torque ratio upper and lower uniform spark limits may vary as a function of engine speed, load, temperature, and source of spark reduction request (e.g., traction control or transmission shift)

Therefore, to provide consistent engine torque it would be desirable to operate engine cylinders in the range 310 or in the range 314. However, if a low level of engine torque greater than zero engine torque is desired during transmission gear shifting to reduce driveline inertia effects on transmission gear shifting, it might be desirable to operate engine cylinders in range 312 to provide the desired engine torque. Thus, there may be a desire to operate engine cylinders within spark retard range 312 to provide a desired engine torque; however, at the same time, it may be desirable to not operate engine cylinders within spark retard range 312 to avoid varying levels of engine torque.

The dilemma posed by spark retard range 312 may be overcome by operating a fraction of engine cylinders in spark retard range 310 while operating the remaining fraction of engine cylinders in spark retard range 314. By operating different groups of cylinders with different retarded spark timings, it may be possible to provide a cylinder torque ratio in the range of 312 while operating engine cylinders with spark timings in ranges 310 and 314. For example, the average cylinder torque ratio may be within the cylinder torque range enclosed by spark retard range 312 even though spark timings for a first group of engine cylinders is within range 310 and even though spark timings for the second group of engine cylinders is within range 314.

It should be noted that the cylinder torque ratio lower uniform spark limit and the cylinder torque ratio lower uniform spark limit or a cylinder torque ratio maximum spark retard may vary with engine operating conditions. Therefore, the spark retard limits may be described based on engine speed and load as a plurality of spark limits.

Figure 4:
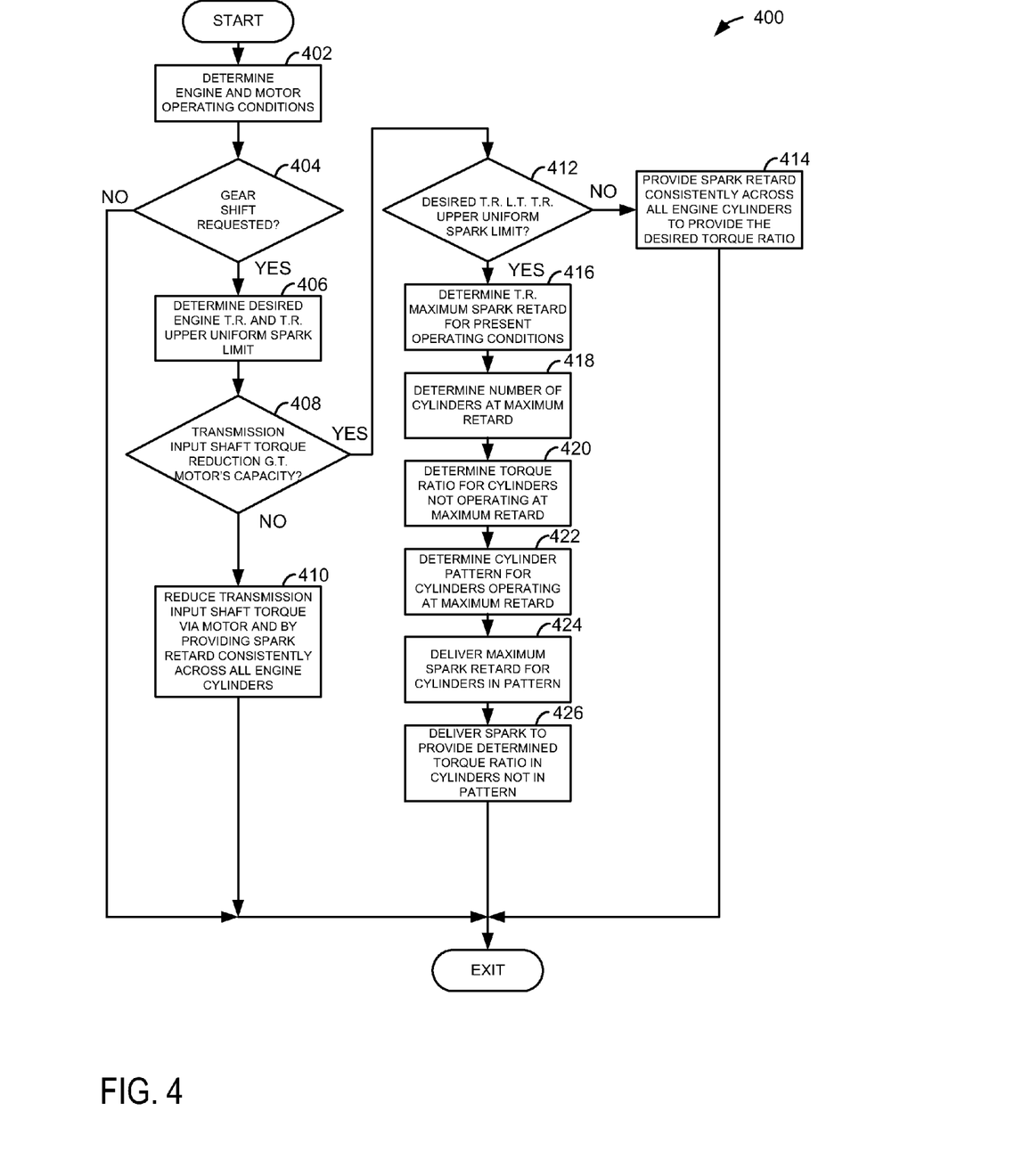
FIG. 4 shows an example method for operating a hybrid vehicle driveline.
Figure 5:
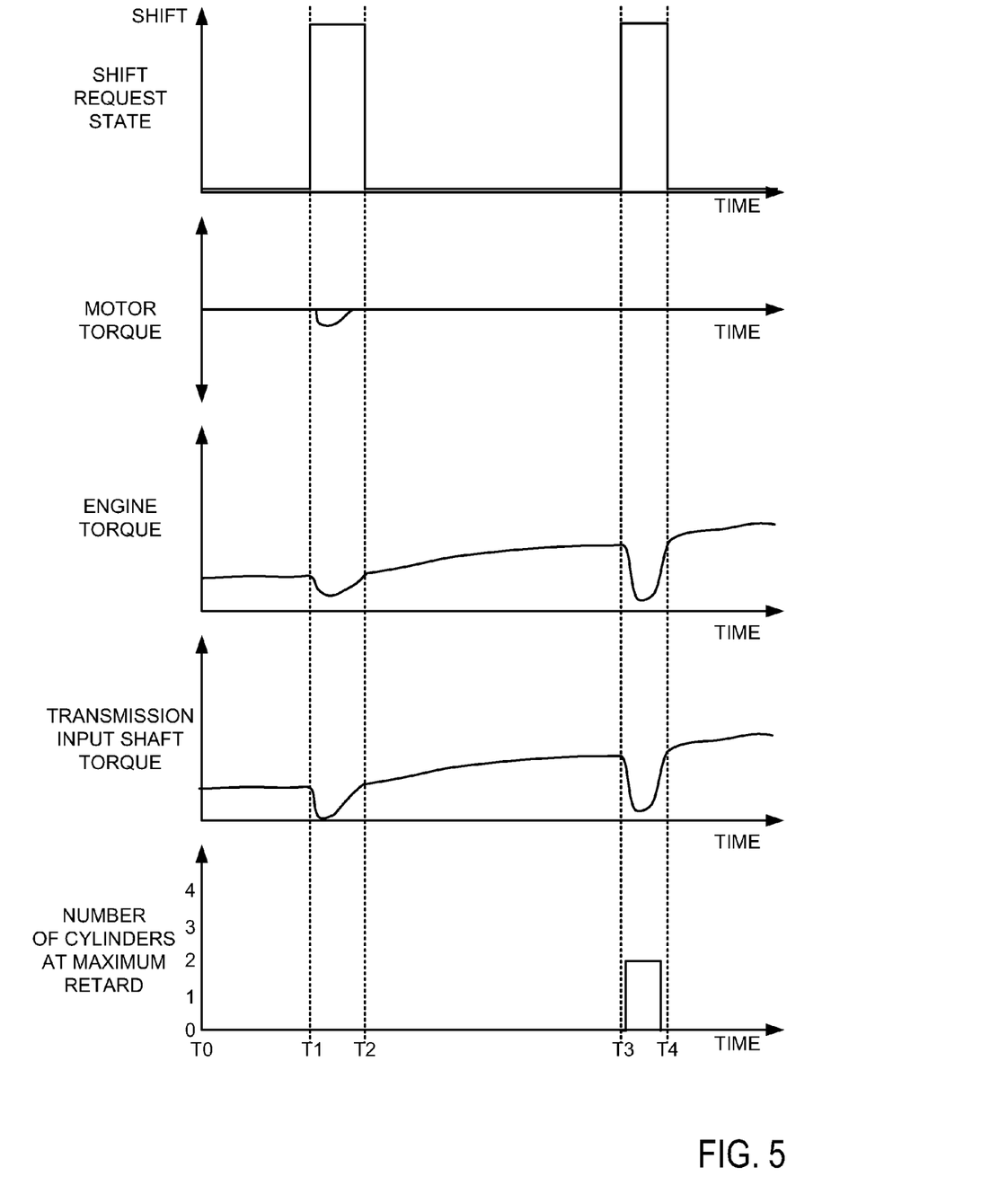
FIG. 5 shows an example transmission gear shifting sequence.

Referring now to FIG. 4, a method for operating a hybrid vehicle driveline is shown. In particular, the method of FIG. 4 describes adjusting spark timing for engine cylinders during shifting gears of a transmission in a hybrid driveline. The method of FIG. 4 may be included in the system of FIGS. 1 and 2 as executable instructions stored in memory. Additionally, the method of FIG. 4 may provide the sequence shown in FIG. 5.

At 402, method 400 determines engine and DISG operating conditions. Engine and DISG operating conditions may include but are not limited to engine speed, vehicle speed, driver demand torque, present transmission gear, requested transmission gear, engine temperature, DISG speed, DISG torque, and ambient air temperature. Method 400 proceeds to 404 after engine and DISG operating conditions are determined.

At 404, method 400 judges if a transmission gear shift is requested. In one example, a transmission gear shift request may be made in response to vehicle speed and driver demand torque. Alternatively, method 400 may judge if driveline torque reduction is requested by another source such as a traction control system. If method 400 judges that a transmission gear shift is requested or an engine torque reduction is requested, the answer is yes and method 400 proceeds to 406. Otherwise, the answer is no and method 400 proceeds to exit.

At 406, method 400 determines a desired cylinder torque ratio and a torque ratio upper uniform spark limit (e.g., 362 of FIG. 3). In one example, the desired cylinder torque ratio may be empirically determined and stored in memory in a table or function that may be indexed by appropriate variables. Different tables or functions may be provided for different torque reduction requestors. For example, if the desired engine torque reduction is based on a gear shift request, the table or function may be indexed by present gear, present engine torque, and engine speed. If the desired engine torque reduction is based on traction control, the table or function may be indexed by present gear, amount of wheel slip, and vehicle speed. Similarly, the torque ratio upper uniform spark limit may be empirically determined and stored in memory. The torque ratio upper uniform spark limit table may be indexed via engine speed, engine load, and engine temperature. Method 400 proceeds to 408 after the desired cylinder torque ratio and the torque ratio upper uniform spark limit are determined.

At 408, method 400 judges if transmission input shaft torque reduction is greater than (G.T.) the DISG's torque reduction capacity and the engine's torque reduction if engine torque is supplied at an cylinder torque ratio greater than an cylinder torque ratio upper uniform spark limit. For example, if engine torque is presently 300 Nm and torque provided to the transmission during the shift is desired to be 35 Nm, method 400 proceeds to 410 if the 35 Nm may be provided to the transmission input by operating the DISG in a regeneration mode and operating the engine at an cylinder torque ratio greater than the cylinder torque ratio upper uniform spark limit. Otherwise, method 400 proceeds to 412 to provide additional engine spark retard. Alternatively, if the engine torque reduction or transmission input torque reduction is based on traction control or another requestor or if the DISG has low regeneration capacity at the present operating conditions, method 400 may proceed to 412.

At 410, method 400 reduces transmission input shaft torque by operating the DISG in a regeneration mode (e.g., as a generator converting torque to electrical energy) and retarding spark consistently (e.g., all cylinders are operated with a same spark retard from MBT) in all engine cylinders by operating the engine at a torque ratio greater than the cylinder torque ratio upper uniform spark limit determined at 406 during the requested transmission shift or in response to the torque reduction request for traction control or another torque reduction requestor. Method 400 exits after reducing driveline torque input to the transmission.

At 412, method 400 judges if the desired cylinder torque ratio (TR) determined at 406 is less than (L.T.) the cylinder torque ratio (TR) upper uniform spark limit determined at 406. If so, the answer is yes and method 400 proceeds to 416. Otherwise, the answer is no and method 400 proceeds to 414.

At 414, method 400 provides spark retard consistently (e.g., the same spark retard or substantially equivalent spark retard (e.g., within ±2 crankshaft degrees)) to all engine cylinders to provide the desired cylinder torque ratio determined at 406. Method 400 proceeds to exit after spark is retarded in engine cylinders.

At 416, method 400 determines a torque ratio maximum spark retard (e.g., the torque ratio at 360 in FIG. 3) for the engine at present operating conditions. In one example, the torque ratio maximum spark retard is empirically determined and stored in a table or function in memory. The table or function may be indexed via engine speed and engine load. Further, the value stored in the table or function may include an offset that retards engine spark so that the torque ratio is well within torque ratios that provide stable and consistent engine torque. Method 400 proceeds to 418 after the torque ratio maximum spark retard is determined.

At 418, method 400 determines a number of cylinders that operate with maximum spark retard from MBT. In one example, the number of cylinders is determined via the following equation:

$$N_{MR} = roundup\left(\frac{N_{total} \cdot (TR_1 - TR_{DES})}{TR_1 - TR_{MR}}\right)$$

where $N_{MR}$ is the number of engine cylinders to operate with maximum spark retard, roundup rounds fractions to the nearest higher value integer, $N_{total}$ is the total number of engine cylinders, $TR_1$ is the torque ratio upper uniform spark limit, $TR_{DES}$ is the desired cylinder torque ratio, and $TR_{MR}$ is the torque ratio maximum spark retard. Method 400 proceeds to 420 after the number of cylinders to operate at maximum spark retard is determined.

At 420, method 400 determines the torque ratio for cylinders that are not operating at the maximum spark retard. In one example, the torque ratio is determined from the following equation:

$$TR_{spark} = \frac{N_{total} \cdot TR_{DES} - N_{MR} \cdot TR_{MR}}{N_{total} - N_{MR}}$$

where $TR_{spark}$ is the torque ratio to operate the engine's remaining cylinders at when the other cylinders are operating at the torque ratio with maximum spark retard. Method 400 proceeds to 420 after the torque ratio to operate remaining engine cylinders at is determined.

At 422, method 400 determines a pattern of cylinders to operate with maximum spark retard based on the number of cylinders being operated at maximum spark retard. For example, if the engine is a four cylinder engine and two cylinders are to operate with maximum spark retard, cylinder numbers 1 and 4 may be selected to operate with maximum spark retard where the engine firing order is 1-3-4-2. In this example, the cylinders are selected so that the cylinders not operating at maximum spark retard are even firing cylinders (e.g., there are a same number of crankshaft degrees between firing events (e.g., combustion events) in the cylinders not operating at maximum spark retard). Empirically determined cylinder firing patterns for operating cylinders at maximum spark retard may be stored in memory and retrieved based on the total number of cylinders and the number of cylinders operating at maximum spark retard. Method 400 proceeds to 424 after the cylinder firing pattern is determined.

At 424, method 400 operates each cylinder in the pattern selected at 422 at the torque ratio for maximum spark retard (e.g., the torque ratio at 360 of FIG. 3). Thus, a fraction of engine cylinders may be operated with maximum spark retard. Method 400 proceeds to 426 after cylinders begin to operate at the torque ratio of maximum spark retard.

At 426, method 400 operates remaining engine cylinders (e.g., cylinders not operating at the torque ratio with maximum spark retard) at the torque ratio $TR_{spark}$ determined at 420. The torque produced by the engine is based on produced by the cylinders operating at the torque ratio with maximum spark retard and torque from cylinders operating at the torque ratio $TR_{spark}$. Method 400 proceeds to exit after the engine cylinders operating at the $TR_{spark}$ torque ratio begin to operate at the $TR_{spark}$ torque ratio.

In this way, a fraction of engine cylinders may operate at a torque ratio with maximum spark retard while other engine cylinders operate with a torque ratio that is greater than a torque ratio where engine torque production may be inconsistent. The spark timing control of method 400 may allow the engine to provide consistent lower torque levels where the engine would otherwise provide inconsistent torque. By providing consistent levels of torque, the transmission may shift more smoothly and driveline wear may be reduced. Further, spark timings that may provide inconsistent torque (e.g., cylinder torque varies from desired cylinder torque by more than three standard deviations) may be avoided.

Thus, the method of FIG. 4 provides for a method, comprising: operating a first group of engine cylinders at a first spark timing retarded from a minimum spark advance for best torque spark timing in response to a gear shift request; and operating a second group of engine cylinders at a second spark timing retarded from the minimum spark advance for best torque spark timing in response to the gear shift request, the second spark timing different from the first spark timing. The method further comprises selecting a cylinder pattern for operating cylinders in the first group of engine cylinders in an even firing order. The method includes where the cylinders in the first group of cylinders provide more torque than the cylinders in the second group of cylinders.

In some examples, the method includes where second group of engine cylinders is selected based on a desired torque ratio. The method also includes where the first group of engine cylinders is operated at a torque ratio based on a number of engine cylinders operating in the second group of engine cylinders. The method includes where torque produced by the first group of engine cylinders deviates less than three standard deviations from a desired torque of the first group of engine cylinders. However, it should be noted that a number of standard deviations greater or less than three may be selected. The method also includes where torque produced by the second group of engine cylinders deviates less than three standard deviations from a desired torque of the second group of engine cylinders.

The method of FIG. 4 also provides for a method, comprising: in a first mode, providing an engine torque reduction in response to a transmission shift request via retarding spark timing in all engine cylinders substantially equally; and in a second mode, providing the engine torque reduction via operating a first group of cylinders at a first torque ratio and a second group of cylinders at a second torque ratio. The method includes where the spark timing at the first torque ratio is advanced of spark timing at the second torque ratio. The method includes where second group of engine cylinders is selected based on a desired torque ratio.

Additionally, the method includes where the first group of engine cylinders is operated at a torque ratio based on a number of engine cylinders operating in the second group of engine cylinders. The method includes where torque produced by the first group of engine cylinders deviates less than three standard deviations from a desired torque of the first group of engine cylinders. The method includes where the engine torque reduction is in response to a transmission gear shift request. The method includes where cylinders in the first group of cylinders operate with an even firing order.

The method of FIG. 4 also provides for a method, comprising: operating a first group of cylinders at first spark timing, the first spark timing retarded from a spark timing that provides inconsistent torque; and operating a second group of cylinders at a second spark timing, the second spark timing advanced from the spark timing that provides inconsistent torque. The method further comprises avoiding spark timing that provides inconsistent torque. The method further comprises determining a number of cylinders for the second group of cylinders based on a torque ratio upper uniform spark limit. The method further comprises determining the number of cylinders for the second group of cylinders based on a torque ratio for maximum spark retard. The method further comprises operating the second group of cylinders at a torque ratio based on a torque ratio for maximum spark retard. The method includes where the torque ratio is further based on a number of cylinders operating with maximum retard.

Referring now to FIG. 5, a plot of an example transmission gear shifting sequence is shown. The sequence of FIG. 5 may be provided by the system of FIGS. 1 and 2 and the method of FIG. 4. Vertical lines at times T1-T4 represent times of particular interest during the sequence. Each of the plots occurs at a same time as the other plots. In this example, the engine is a four cylinder engine.

The first plot from the top of FIG. 5 is a plot of transmission shift state request versus time. A transmission gear shift is requested when the shift state trace is at a higher level near the Y axis arrow. The Y axis represents shift state. A shift is requested when the shift state is at a higher level. A shift is not requested when the shift state is at a lower level. The X axis represents time and time increases from the left side of the plot to the right side of the plot.

The second plot from the top of FIG. 5 is a plot of motor or DISG torque versus time. The Y axis represents motor torque and the X axis represents time. Motor torque is positive when the trace is above the X axis, and motor torque is negative (e.g., regeneration mode) wen the trace is below the X axis. Motor torque increases as the trace moves away from the X axis in the positive or negative directions.

The third plot from the top of FIG. 5 is a plot of engine torque versus time. The Y axis represents engine torque and engine torque increases in the direction of the Y axis arrow. The X axis represents time and time increases from left to right.

The fourth plot from the top of FIG. 5 is a plot of transmission input shaft torque versus time. The Y axis represents transmission input shaft torque and transmission input shaft torque increases in the direction of the Y axis arrow. The X axis represents time and time increases from left to right. Transmission input shaft torque may be a combination of engine torque and DISG torque.

The fifth plot from the top of FIG. 5 is a plot of a number of engine cylinders operating at the torque ratio of maximum spark retard versus time. The Y axis represents a number of engine cylinders operating at the torque ratio of maximum spark retard. The number of engine cylinders is shown along the Y axis. The X axis represents time and time increases from left to right.

At time T0, there is no gear shift and motor torque is zero. The motor torque may be zero when the engine is the sole source of driveline torque. Additionally, the engine torque is at a lower level. The transmission input shaft torque is also at a lower level and no cylinders are operating at the torque ratio with maximum spark retard.

At time T1, the shift request is asserted and the motor begins to supply negative torque to the driveline to assist in lowering the transmission input shaft torque during the gear shift. The engine torque is also being reduced via retarding spark in each cylinder by a same amount. Thus, transmission input shaft torque is reduced via engine spark timing and operating the DISG in regeneration mode. The DISG may assist in reducing driveline torque if the DISG has capacity to reduce driveline torque. The number of cylinders operating at the torque ratio with maximum spark retard is zero since the DISG and engine cylinders operating with a same spark advance may reduce transmission input shaft torque to a desired level.

At time T2, the shift request state transitions to a low level to indicate that the gear shift is complete. The motor torque returns to zero and the engine torque increases as spark is advance in response to the shift being complete. The transmission input shaft torque also increases and the number of cylinders operating at the torque ratio with maximum spark retard remains at zero.

At time T3, the shift state transitions to a higher level to request a gear shift. The motor is not operated as a generator because the motor may not operate as a generator at the present operating conditions. The engine torque and transmission input shaft torque are reduced via operating engine cylinders at a torque ratio with maximum spark retard. In this example, two cylinders are operated at a torque ratio with maximum spark retard and the other two cylinders are operated at a torque ratio of $TR_{spark}$ as described in method 400. By operating the engine with cylinders at two different torque ratios where engine torque production is consistent, it may be possible to reduce transmission component degradation and improve transmission shift feel.

At time T4, the shift request state transitions to a low level to indicate that the gear shift is complete. The motor torque returns to zero and the engine torque increases as spark is advance in response to the shift being complete. The transmission input shaft torque also increases and the number of cylinders operating at the torque ratio with maximum spark retard remains at zero.

In this way, transmission input shaft torque may be reduced by reducing engine torque or reducing engine torque and operating the DISG in a regeneration mode. Further, engine torque may be reduced by operating two different groups of cylinders at two different spark retard values from MBT spark timing.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method, comprising:
operating a first group of engine cylinders at a first spark timing retarded from a threshold spark timing via a controller in response to a gear shift request; and
operating a second group of engine cylinders at a second spark timing retarded from the threshold spark timing via the controller in response to the gear shift request, the second spark timing different from the first spark timing.

2. The method of claim 1, further comprising selecting a cylinder pattern for operating cylinders in the first group of engine cylinders in an even firing order.

3. The method of claim 2, where the cylinders in the first group of cylinders provide more torque than the cylinders in the second group of cylinders.

4. The method of claim 1, where the second group of engine cylinders is selected based on a desired torque ratio.

5. The method of claim 4, where the first group of engine cylinders is operated at a torque ratio different from a torque ratio that the second group of engine cylinders is operated.

6. The method of claim 1, where torque produced by the first group of engine cylinders deviates less than three standard deviations from a desired torque of the first group of engine cylinders.

7. The method of claim 6, where torque produced by the second group of engine cylinders deviates less than three standard deviations from a desired torque of the second group of engine cylinders.

8. A method, comprising:
in a first mode, providing an engine torque reduction via a controller in response to a transmission shift request, the engine torque reduction provided via retarding spark timing in all engine cylinders substantially equally; and in a second mode, operating a first group of cylinders at a first torque ratio and a second group of cylinders at a second torque ratio via the controller to provide the engine torque reduction.

9. The method of claim 8, where spark timing at the first torque ratio is advanced of spark timing at the second torque ratio.

10. The method of claim 9, where the second group of cylinders is selected based on a desired torque ratio.

11. The method of claim 10, where the first group of cylinders is operated at a torque ratio different from a torque ratio that the second group of cylinders is operated.

12. The method of claim 8, where torque produced by the first group of cylinders deviates less than three standard deviations from a desired torque of the first group of cylinders.

13. The method of claim 8, where the engine torque reduction is in response to a transmission gear shift request.

14. The method of claim 8, where cylinders in the first group of cylinders operate with an even firing order.

15. A method, comprising:
operating a first group of cylinders of an engine at a first spark timing via a controller, the first spark timing retarded from a spark timing that provides inconsistent torque; and
operating a second group of cylinders of the engine at a second spark timing via the controller, the second spark timing advanced from the spark timing that provides inconsistent torque, where inconsistent torque is torque that varies by more than three standard deviations from a desired torque.

16. The method of claim 15, further comprising avoiding spark timing that provides inconsistent torque.

17. The method of claim 15, further comprising determining a number of cylinders for the second group of cylinders based on a torque ratio upper uniform spark limit.

18. The method of claim 17, further comprising determining the number of cylinders for the second group of cylinders based on a torque ratio.

19. The method of claim 18, where the torque ratio of the second group of cylinders is further based on a number of cylinders operating with retarded spark timing.

* * * * *